United States Patent
Pekoz et al.

(10) Patent No.: US 10,348,530 B1
(45) Date of Patent: Jul. 9, 2019

(54) COMBINED MINIMIZATION OF INTERSYMBOL INTERFERENCE (ISI) AND ADJACENT CHANNEL INTERFERENCE (ACI)

(71) Applicants: Berker Pekoz, Tampa, FL (US); Selcuk Kose, Tampa, FL (US); Huseyin Arslan, Tampa, FL (US)

(72) Inventors: Berker Pekoz, Tampa, FL (US); Selcuk Kose, Tampa, FL (US); Huseyin Arslan, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 16/050,838

(22) Filed: Jul. 31, 2018

Related U.S. Application Data

(60) Provisional application No. 62/569,220, filed on Oct. 6, 2017.

(51) Int. Cl.
| | |
|---|---|
| H04L 25/03 | (2006.01) |
| H04W 72/08 | (2009.01) |
| H04B 1/10 | (2006.01) |
| H04L 27/26 | (2006.01) |
| H04L 25/02 | (2006.01) |
| H04L 5/00 | (2006.01) |

(52) U.S. Cl.
CPC ..... H04L 25/03019 (2013.01); H04B 1/1027 (2013.01); H04L 25/0212 (2013.01); H04L 27/2607 (2013.01); H04W 72/082 (2013.01); H04B 2001/1045 (2013.01); H04L 5/0007 (2013.01)

(58) Field of Classification Search
CPC ........... H04L 25/03019; H04L 25/0212; H04L 27/2607; H04L 5/0007; H04B 1/1027; H04B 2001/1045; H04W 72/082
See application file for complete search history.

(56) References Cited

U.S. PATENT DOCUMENTS 8,908,796 B1    12/2014  Guvenkaya et al.
9,479,272 B2 *  10/2016  Bae .................. H04L 25/03821
(Continued)

OTHER PUBLICATIONS

Guvenkaya et al., A Windowing Technique for Optimal Time-Frequency Concentration and ACI Rejection in OFDM-Based Systems, IEEE transactions on Communciations, vol. 63, No. 12, pp. 4977-4980 (Year: 2015).*

(Continued)

*Primary Examiner* — Freshteh N Aghdam
(74) *Attorney, Agent, or Firm* — Molly L. Sauter; Smith & Hopen, P.A.

(57) ABSTRACT

Adaptive windowing of insufficient cyclic prefix (CP) for joint minimization of intersymbol interference (ISI) and adjacent channel interference (ACI) is provided. The proposed subcarrier specific windowing scheme improves the signal-to-interference ratio (SIR) even when the cyclic prefix (CP) is insufficient. Average optimal window lengths depend only on the power density profiles (PDPs), and although instantaneous optimal window lengths depend on users' channel impulse responses (CIRs), fluctuation is little. Therefore, subcarrier specific windowing outperforms fixed windowing, even with outdated window lengths in the case of powerful interferers.

20 Claims, 7 Drawing Sheets

(56) References Cited

U.S. PATENT DOCUMENTS

| | | | |
|---|---|---|---|
| 2011/0142027 A1* | 6/2011 | Shi | H04L 1/0071 370/345 |
| 2015/0372843 A1* | 12/2015 | Bala | H04L 25/03834 375/295 |
| 2018/0054341 A1* | 2/2018 | Jia | H04L 25/03828 |
| 2018/0332573 A1* | 11/2018 | Yu | H04W 72/0406 |

OTHER PUBLICATIONS

Ankarali et al., Flexible Radio Access Beyond 5G: A Future Projection on Waveform, Numerology & Frame Design Principles. IEEE Access. 2017:1-16.

Guvenkaya et al., A Windowing Technique for Optimal Time-Frequency Concentration and ACI Rejection in OFDM-Based Systems. IEEE Transactions on Communications. 2015. vol. 63 (No. 12): 4977-4989.

Sahin and Arslan. Edge Windowing for OFDM Based Systems. IEEE Communications Letters. 2011. vol. 15 (No. 11):1208-1211.

* cited by examiner

COMBINED MINIMIZATION OF INTERSYMBOL INTERFERENCE (ISI) AND ADJACENT CHANNEL INTERFERENCE (ACI)

CROSS-REFERENCE TO RELATED APPLICATIONS

This nonprovisional application claims priority to U.S. Provisional Patent Application No. 62/569,220, entitled "Adaptive Utilization of Insufficient Cyclic Prefix (CP) For Joint Minimization of Intersymbol Interference (ISI) And Adjacent Channel Interference (ACI)", filed Oct. 6, 2017 by the same inventors, the entirety of which is incorporated herein by reference.

FEDERALLY SPONSORED RESEARCH OR DEVELOPMENT

This invention was made with government support 1609581 awarded by the National Science Foundation. The Government has certain rights in the invention.

BACKGROUND OF THE INVENTION

Conventional orthogonal frequency division multiplexing (OFDM) receivers are designed assuming the cyclic prefix (CP) is longer than the maximum excess delay (MED) of the desired users channel, thereby reducing intersymbol interference (ISI). Users in adjacent bands are assumed to cause negligible adjacent channel interference (ACI). This is achieved by avoiding channels with maximum excess day longer than the cyclic prefix by elongating the cyclic prefix durations, such as the extended-CP option in Long Term Evolution (LTE). Possible adjacent channel interference due to interferers in adjacent bands are either mitigated using interference cancellation or avoided by increasing guard bandwidth until adjacent channel interference power becomes negligible or suppressed.

There are numerous approaches known for suppressing ACI. The most prominent approach is windowing, which is popular due to its low computational complexity and efficacy. Windowing can be applied at the transmitter to reduce out-of-band (OOB) emission and corresponding ACI before it eventuates, or alternatively, windowing can be used at the receiver to reject present ACI. However, known windowing techniques utilize the same window function for all subcarriers, while it is known that edge subcarriers are critical in out-of-band emissions and are more prone to present ACI. Subcarrier specific windowing (SSW) techniques at both the transmitter and receiver are known in the art. However, the known SSW implementations assume that the cyclic prefix (CP) is longer than the maximum excess delay (MED) of the channel, to accommodate windowing and limit the window length to the guard interval that is not disturbed by multipath reception. Implementations of subcarrier specific windowing are also known to allocate additional samples for windowing, thereby reducing spectral efficiency, which is undesirable.

Cellular communication standards beyond 5G are envisioned to simultaneously provide diverse services, with various requirements, to a myriad of devices. Increasing spectral efficiency is crucial to effectively supporting the projected number of devices, particularly in lower carrier frequencies, thereby favoring reduced guards. Using cyclic prefix durations shorter than the users' maximum excess delay have been proposed to satisfy the lower latency required by new services in systems beyond 5G, while also increasing spectral efficiency.

However, the conventional approaches do not address the requirements of communication systems beyond 5G. Asynchronous, non-orthogonal waveforms with different parameterizations, referred to as numerologies, are also proposed to be used in adjacent bands to provide diverse services in future standards. However, determining the adjacent channel interference (ACI) caused by such non-orthogonal numerologies has not been previously addressed.

Accordingly, what is needed in the art is an improved system and method that addresses the additional requirements of communication systems beyond 5G, including increased spectral efficiency and adaptations for non-orthogonal numerologies.

SUMMARY OF INVENTION

This invention addresses the interference resulting from resource shortage in both the time domain and the frequency domain of a wireless communication system, including insufficiency of guard time between consecutive symbols of a user and insufficient guard band between users communicating in adjacent bands. Such resource shortage is expected to occur in future cellular communication networks as studies have proposed shortening guard times to reduce latencies and reducing guard bands to increase the number of users, as well addressing asynchronization.

In various embodiments, the present invention provides a method for windowing of an Orthogonal Frequency Division Multiplexing (OFDM)-based signal, which includes, receiving, at a receiver, an OFDM-based signal comprising a plurality of subcarriers, estimating an aggregate adjacent channel interference (ACI) and intersymbol interference (ISI) at each of the plurality of subcarriers, estimating an optimal window duration for each of the plurality of subcarriers, where in the optimal window duration is the duration that minimizes the aggregate adjacent channel interference (ACI) and intersymbol interference (ISI) at each of the plurality of subcarriers and performing, at the receiver, windowing of each of the plurality of subcarriers of the received OFDM-based signal by multiplying each of the plurality of subcarriers by the optimal window duration to generate a filtered OFDM-based signal.

In one embodiment, the optimal window duration for each of the plurality of subcarriers is an instantaneous optimal window duration and the optimal window duration is determined to be the duration that minimizes the aggregate adjacent channel interference (ACI) and intersymbol interference (ISI) at each of the plurality of subcarriers based upon the power density profile (PDF) and the channel impulse (CIR) for each of the plurality of subcarriers.

In another embodiment, the optimal window duration for each of the plurality of subcarriers is an instantaneous average window duration and the optimal window duration is determined to be the duration that minimizes the aggregate adjacent channel interference (ACI) and intersymbol interference (ISI) at each of the plurality of subcarriers based upon the power density profile (PDF) for each of the plurality of subcarriers.

In an additional embodiment, the method of the present invention for windowing of an Orthogonal Frequency Division Multiplexing (OFDM)-based signal may be performed at a transmitter prior to transmitting the OFDM-based signal over the communication channel.

The invention further includes, a receiver for windowing of an Orthogonal Frequency Division Multiplexing (OFDM)-based signal. In a particular embodiment, the receiver includes, an analog to digital module configured for receiving an OFDM-based signal comprising a plurality of subcarriers. The receiver further includes a receiver filter coupled to the analog to digital module, the receiver filter configured for estimating an aggregate adjacent channel interference (ACI) and intersymbol interference (ISI) at each of the plurality of subcarriers, for estimating an optimal window duration for each of the plurality of subcarriers, where in the optimal window duration is the duration that minimizes the aggregate adjacent channel interference (ACI) and intersymbol interference (ISI) at each of the plurality of subcarriers and for performing windowing of each of the plurality of subcarriers of the received OFDM-based signal by multiplying each of the plurality of subcarriers by the optimal window duration to generate a filtered OFDM-based signal. The receiver additionally includes, a demodulation module coupled to the receiver filter, the demodulation module configured for receiving the filtered OFDM-based signal and for demodulating each of the plurality of subcarriers of the OFDM-based signal.

The invention may additionally includes, a transmitter for windowing of an Orthogonal Frequency Division Multiplexing (OFDM)-based signal. The transmitter may include, a modulation module configured to receive a digital signal to be transmitted, the modulation module configured to modulate the digital signal to generate an OFDM-based signal comprising a plurality of subcarriers. The transmitter may further include, a transmitter filter coupled to the modulation module, the transmitter filter configured for estimating an aggregate adjacent channel interference (ACI) and intersymbol interference (ISI) at each of the plurality of subcarriers, for estimating an optimal window duration for each of the plurality of subcarriers, where in the optimal window duration is the duration that minimizes the aggregate adjacent channel interference (ACI) and intersymbol interference (ISI) at each of the plurality of subcarriers and for performing windowing of each of the plurality of subcarriers of the received OFDM-based signal by multiplying each of the plurality of subcarriers by the optimal window duration to generate a filtered OFDM-based signal. The transmitter may additionally include, a digital to analog module coupled to the transmitter filter, the digital to analog module configured for transmitting the filtered OFDM-based signal.

In this present invention, insufficient cyclic prefix is optimally utilized to jointly minimize ISI and ACI, thereby adaptively addressing spectral efficiency requirements of systems beyond 5G and the corresponding real-time conditions. In various embodiments, incident ISI caused by insufficient CP is first determined, and ACI caused by different numerologies in adjacent bands is then determined. The combined interference power for each subcarrier is then minimized to optimize the solution.

BRIEF DESCRIPTION OF THE DRAWINGS

For a fuller understanding of the invention, reference should be made to the following detailed description, taken in connection with the accompanying drawings, in which.

DETAILED DESCRIPTION OF THE INVENTION

Figure 1:
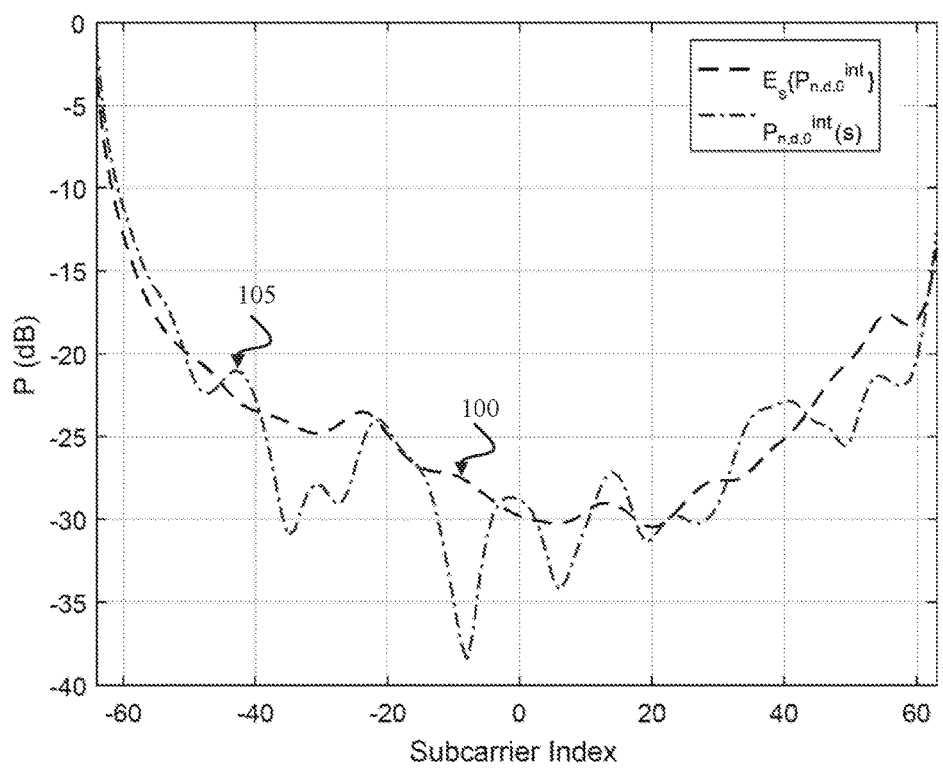
FIG. 1 is a graphical illustration of the post-equalization $\mathbb{E}_s\{P_{n,d,0}^{int}\}$ and $P_{n,d,0}^{int}(s)$ for a realization, for $L_{n,d,0}^{W} = 0 \forall n$.

In various embodiments, the method of the present invention proposes windowing the cyclic prefix (CP) at the receiver utilizing subcarrier specific windowing. The specific duration of the window for each subcarrier is the duration that minimizes the aggregate interference caused by the insufficiency of the cyclic prefix, with respect to the effective channel length, and the interference caused by asynchronous communication in adjacent bands.

In a practical scenario, multiple users are simultaneously transmitting data to a base station of a communication network using finite duration electromagnetic pulses. The electromagnetic pulses are modulated to adjacent frequency bands, utilizing a protocol commonly referred to as Frequency-Division Multiple Access (FDMA). FDMA assigns users an individual allocation of one or several frequency bands, or channels. The data of each user that is transmitted on the channel(s) must be received separately at the receiver, because they use different multicarrier pulse shapes.

Due to the electromagnetic waves being reflected, scattered or slowed down by physical objects, in addition to the variation in distances between the user and the base station, multiple copies of the signal arrive at the receiver of the base station at various times having different complex gains, which is commonly referred to as multi-path fading. In multi-path fading, if one symbol of the modulated signal interferes with the reception pulse of the next symbol, intersymbol interference (ISI) occurs.

Additionally, because the transmitted electromagnetic pulses used to communicate on the channel do not have infinite duration, they have non-zero power beyond their allocated band. This non-zero power outside of the assigned band of the user results in interference to the users communicating in these bands, which is commonly referred to as adjacent channel interference (ACI).

The electromagnetic pulses transmitted on the channel are a function of the information (data) transmitted to the users. As such, the intersymbol interference (ISI) and the adjacent channel interference (ACI) are also dependent upon the information transmitted by both the user of interest and the users operating in the adjacent bands. Additionally, time dispersion, or echoes, caused by multi-path propagation delays changes the received aggregate signal, which effects the reception of both the signal of interest and the reception of the signals in the bands adjacent to the bands used by the signal of interest.

The inventive method formulates the calculation of expected interference due to any OFDM signal in the Gabor lattice and encloses the original idea of windowing each subcarrier differently at the receiver, even in the absence of undistorted cyclic prefix, to maximize signal to interference ratio (SIR).

In a particular embodiment, a 1-indexed algebra is used where $I_N$, is the N×N identity matrix, $0_{N\times M}$ is the N×M zero and $1_{N\times M}$ is the N×M ones matrix. Conjugate, transpose and Hermitian operations are denoted by $(\bullet)^*$, $(\bullet)^T$ and $(\bullet)^H$, respectively. A⊙B is the Hadamard product of matrices A and B and A⊘B denotes the Hadamard division of A to B. $X^{\odot 2}$ is the Hadamard product of matrix X with itself. $\mathbb{E}_a\{\bullet\}$ is the expectation operator over variable a. diag (c1, c2, . . . , cN) represents the N×N diagonal matrix with diagonal elements c1, c2, . . . , $c_N$, toep ($\vec{A}$, $\vec{B}$) denotes the Toeplitz matrix of which first column is $\vec{A}$ and first row is $\vec{B}$, δ(•) is the Dirac delta function, N (μ;σ²) is the normal distribution with mean μ and variance σ², and fliplr (•) is the function that flips a matrix from left to right, i.e., $X_{M,n}$=fliplr $(X_{M,N-n+1})$. All properties existing with subscripts $\bullet_u$ denote that the given matrix or vector is associated with the uth user.

Let $s_u \in \mathbb{C}^{M_u \times I_u}$ denote the modulated data symbols, where $M_u$ is number of uth user's data subcarriers and $I_u$ is the number of uth user's OFDM symbols in a frame. $Q_u \in \mathbb{R}^{N_u \times M_u}$ is uth user's subcarrier mapping matrix. $A_u \in \mathbb{R}^{N_u + K_u \times N_u}$ is uth user's CP insertion matrix, consisting of:

$$A_u = \begin{bmatrix} 0_{K_u \times (N_u - K_u)} & I_{K_u} \\ & I_{N_u} \end{bmatrix} \quad (1)$$

in the case of no transmitter windowing, where $K_u$ is the number of CP samples. The CP removal and windowing matrix $B_{L_{n,i,u}^W} \in \mathbb{R}^{N_u \times N_u + K_u}$ is shown in equation (2), where $L_{n,i,u}^W \in \{0, 1, \ldots, K_u\}$ is the taper length of either side of the window, in number of samples, used for the reception of the nth subcarrier of ith OFDM symbol of uth user and $W_{\vec{n},i,u} \in \mathbb{R}^{1 \times L_{n,i,u}^W}$ the receiver window coefficients, are calculated using W $$(k; L_{n,i,u}^W) = \left(1 + \cos\left(\frac{\pi k}{L_{n,i,u}^W + 1}\right)\right), k = 1, 2, \ldots, L_{n,i,u}^W,$$

which generates raised cosine window coefficients using taper length instead of roll-off. Note that when $L_{n,i,u}^W = 0$, equation (2) simplifies to $B_0 = [0_{N_u \times K_u} \ I_{N_u}]$, which is the CP removal matrix without windowing.

$$B_{L_{n,i,u}^W} = \begin{bmatrix} 0_{N_u - L_{n,i,u}^W \times K_u - L_{n,i,u}^W} & 0_{N_u - L_{n,i,u}^W \times L_{n,i,u}^W} & I_{N_u - L_{n,i,u}^W} & 0_{N_u - L_{n,i,u}^W \times L_{n,i,u}^W} \\ 0_{L_{n,i,u}^W \times K_u - L_{n,i,u}^W} & \mathrm{diag}(fliplr(W_{n,i,u})) & 0_{L_{n,i,u}^W \times N_u - L_{n,i,u}^W} & \mathrm{diag}(W_{n,i,u}) \end{bmatrix} \quad (2)$$

$h_{\vec{i},u} \in \mathbb{C}^{1 \times L_u}$ denotes the CIR invariant during reception of the corresponding OFDM symbol where $L_u$ is the MED uth user experiences in number of samples, which is obtained by $$h_{\vec{i},u}(k) = \sqrt{P_u \frac{1-\alpha_u}{1-\alpha_u^{L_u}}} \alpha_u^k \vec{v}(k)$$

where $P_u$ is the received power of uth user's signal $\alpha_u$ is the exponential decay rate of uth user's channel $\vec{v}(k) \in \mathbb{C}^{1 \times L_u} \sim \mathrm{CN}(0,1) \forall k \in \{0, 1, \ldots, L_u-1\}$ [10]. Then, $h_{i,u}^{conv} \in \mathbb{C}^{N_u + K_u \times N_u + K_u}$ is the linear channel convolution matrix bounded to one symbol duration, $$h_{i,u}^{conv} = toep([h_{\vec{i},u} \ 0_{1 \times N_u + K_u - L_u}]^T, [h_{\vec{i},u}(0) \ 0_{1 \times N_u + K_u - 1}]).$$

$h_{\vec{i},u} \in \mathbb{C}^{N_u \times 1}$ is the channel frequency response (CFR) of uth user's ith OFDM symbol, which can be calculated as $$H_{\vec{i},u} = \sqrt{N_u} F_u [h_{\vec{i},u} \ 0_{1 \times N_u - L_u}]^T.$$

Defining the ISI free condition as:

$$K_u - L_{n,i,u}^W \geq L_u, \forall n \in \{1, 2, \ldots, N_u\} \quad (3)$$

Assume desired OFDM symbol is the dth OFDM symbol of 0th user. Let us first assume the absence of the interfering users, and equation (3) is satisfied. In this case the product $B_{L_{d,0}^W} h_{d,0}^{conv} A_0$ results in the perfect circular channel convolution matrix $h_{d,0}^{circ} \in \mathbb{C}^{N_0 \times N_0}$ shown in equation (4).

$$h_{i,u}^{circ} = \quad (4)$$
$$toep([h_{\vec{i},u} \ 0_{1 \times \vec{N}_u - L_u}]^T, [h_{\vec{i},u}(0) \ fliplr([h_{\vec{i},u}(1: L_u - 1) \ 0_{1 \times \vec{N}_u - L_u}])])$$

Furthermore, $F_0 B_{L_{d,0}^W} h_{d,0}^{conv} A_0 F_0^H$ results in diag ($\vec{H}_{d,0}$), where $F_u \in \mathbb{C}^{N \times N}$ denotes the normalized fast Fourier transformation (FFT) matrix uth user uses in the generation and reception of OFDM symbols. Hence, ignoring the noise, the received symbols $$y_{:,\vec{d},0} = F_0 B_{L_{d,0}^W} h_{d,0}^{conv} A_0 F_0^H Q_u s_{:,\vec{d},0} = \mathrm{diag}(\vec{H}_{d,0}) s_{:,\vec{d},0} = \vec{H}_{d,0} \odot s_{:,\vec{d},0} \cdot y_{:,\vec{d},0}$$

is equalized using zero forcing (ZF) equalization via a similar Hadamard division by CFR to obtain the symbol estimates $\hat{s}_{:,d,0} \in \mathbb{C}^{N_0 \times 1}$.

$$\hat{s}_{:,d,0} = Q_u^H (y_{:,\vec{d},0} \oslash \hat{H}_{d,0}) \quad (5)$$

where, $\hat{H}_{d,0}$ is the desired OFDM symbol's channel frequency response (CFR) that is estimated at the receiver.

In this present invention, although there would be residual ISI, as equation (3) is invalid, equalization will still be performed as in equation (5) and no interference cancellation technique, other than receiver windowing, is applied to reduce the ACI and residual ISI. In the scenario of interest, the received signal consists of the distorted desired signal and interference from other signals, including ISI from the previous symbol, and ACI from signals in adjacent bands. One of the goals of the present invention is to minimize the aggregation of the distortion of the desired signal and the interference.

The distortion of the desired signal can be determined by calculating the difference between the signal that would have been received if equation (3) was satisfied, and the actual received signal. If equation (3) was satisfied, the channel convolution matrix would have been perfectly circular, and the received signal would be $y_{:,\vec{d},0} = F_0 h_{d,0}^{circ} F_0^H Q_0 s_{:,\vec{d},0}$. Then, the difference between the perfect and effective circular channel convolution matrices when CP is added using equation (1) and removed using equation (2), forms the distortion matrix $h_{d,0}^{dist} \in \mathbb{C}^{N_u \times N_u}$, which is $h_{d,0}^{dist} = B_{L_{n,i}} h^{conv} A - h^{circ}$. Hence, the distortion in the nth subcarrier of the desired OFDM symbol is found as $y_{n,d,0}^{\overrightarrow{dist}} = F_0 h_{d,0}^{dist} F_0^H Q_u s_{:,\vec{d},0}$.

The ISI and ACI from all other signals are calculated by projecting samples of each received OFDM symbol to the corresponding samples of the desired OFDM symbol in this asynchronous scenario. Each received OFDM symbol affects a total of $$\frac{\Delta f_0}{\Delta f_u}(N_u + K_u(L_u - 1))$$

time samples. The channel output, including the CIR filter tail, is calculated by left multiplying the transmit samples with $$h_{i,u}^{full} \in \mathbb{C}^{\frac{\Delta f_0}{\Delta f_u}(N_u + K_u(L_u - 1)) \times N_u + K_u},$$

where $$h_{i,u}^{full} = toep([h_{\vec{i},u} \; 0_{1 \times N_u + K_u - 1}]^T, [h_{\vec{i},u}(0) \; 0_{1 \times N_u + K_u - 1}])R,$$

where $$R \in \mathbb{C}^{\frac{\Delta f_0}{\Delta f_u}(N_u + K_u(L_u - 1)) \times 1}$$

is any resampling transform. Let $$t_{\vec{i},u} \in \mathbb{R}^{\frac{\Delta f_0}{\Delta f_u}(N_u + K_u(L_u - 1)) \times 1}$$

denote the time indices of the received samples that contains energy from the samples of the ith OFDM symbol of uth user. Then, a projection matrix $$\prod_{i,u:d,0} \in \mathbb{R}^{N_0 + K_0 \times \frac{\Delta f_0}{\Delta f_u}(N_u + K_u(L_u - 1))}$$

formed such that the misaligned, asynchronous samples are projected onto the received symbol:

$$\prod_{i,u:d,0}(g, j) = \begin{cases} 1, & t_{\vec{d},0}(g) = t_{\vec{i},u}(j) \\ 0, & o.w. \end{cases} \quad (6)$$

Thus, the aggregate interference on the nth subcarrier of the desired symbol is found as:

$$y_{n,d,0}^{\overrightarrow{int}} = y_{n,d,0}^{\overrightarrow{dist}} + \sum_{\substack{u,i \\ \{i,u\} \neq \{d,0\}}} \sum F_0 B_{L_{n,d,0}^W} \prod_{i,u:d,0} h_{i,u}^{full} A_u F_u^H Q_u s_{:,\vec{i},0} \quad (7)$$

Using this formulation, the instantaneous interference power is easily calculated if all parameters are known. Note that in the numerical verification of this work, sampling rates are matched using Fourier interpolation, implying a Dirichlet kernel.

However, practically, information symbols of all users are unknown at the time of reception and, as such, an estimate of the expected interference power is needed. To calculate this value, the following statistical conjecture is used:

Conjecture 1. The symbols transmitted using any subcarrier of any OFDM symbol of any user are independent from each other and the used modulation is unit average power, i.e., $\mathbb{E}\{s_{n,i,u} s^*_{n',i',u'}\} = \delta(n-n')\delta(i-i')\delta(u-u') \forall n, n', i, i', u, u'$.

Conjecture 1 implies that, for a practical number of subcarriers, the variance of their sum is the sum of their variances by the law of large numbers. Each column of $F^H$ contains the phase rotation of a normal random variable and the sum of variances of all columns yields the total interference power contributed to the symbol. Thus, the expected aggregate interference to the nth received subcarrier of the desired user is given in the nth column of $$\begin{array}{c} u, i \\ \{i, u\} \neq \{d, 0\} \end{array} \quad (8)$$

$$\mathbb{E}_s\{P_{:,d,0}^{int}\} = 1_{1 \times N}\left(\left|F_0 h_{d,0}^{dist} F_0^H Q_u s_{:,\vec{d},0}\right|^{\odot 2}\right)^T +$$

$$\sum\sum 1_{1 \times N}\left(\left|F_0 B_{L_{n,d,0}^W} \prod_{i,u:d,0} h_{i,u}^{full} A_u Q_u F_u^H\right|^{\odot 2}\right)^T$$

where the nth column of $1_{1 \times N} X^T$ contains the sum of all elements in the nth row of X.

In the proposed method of the present invention, the receiver is to solve either of:

$$L_{n,i,u}^{SSW} = \arg_{L_{n,d,u}^W} \min \; \mathbb{E}_s\{P_{n,d,u}^{int}\} \quad (9)$$

$$L_{n,u}^{avs} = \arg_{L_{n,i,u}^W} \min \; \mathbb{E}_i\{\mathbb{E}_s\{P_{n,i,u}^{int}\}\} \quad (10)$$

$$L_{d,u}^{fix} = \arg_{L_{n,u}^W} \min \; \mathbb{E}_n\{\mathbb{E}_s\{P_{n,d,u}^{int}\}\} \quad (11)$$

$$L_u^{avf} = \arg_{L_{n,i,u}^W} \min \; \mathbb{E}_i\{\mathbb{E}_n\{\mathbb{E}_s\{P_{n,i,u}^{int}\}\}\} \quad (12)$$

subject to $L_{n,i,u}^W \in \{0, 1, \ldots, K_u\}$ (13)

to find:
1) optimal subcarrier specific windows (SSWs) lengths for known channel impulse responses (CIRs) from equation (9)
2) average subcarrier specific windows SSW lengths depending on users' power delay profiles (PDPs) from equation (10)
3) optimal window length for conventional "fixed" receiver windowing using the same window lengths for all subcarriers for known channel impulse responses (CIRs) from equation (11)
4) average fixed length depending on users' power delay profiles (PDPs) from equation (12).

The required computational complexity of the options decreases, along with the resulting performance, from option 1) down to option 4).

In the present invention, the instantaneous optimal window lengths depend upon the channel impulse responses (CIRs), however, the average optimal window lengths are obtained only for the power delay profiles (PDPs), wherein the PDPs are the mean of the magnitude of the CIRs over a plurality of OFDM symbols.

In most practical cases, the PDPs are simpler to obtain, as compared to the full channel information. Accordingly, in the present invention, the magnitude alone can be used without the instantaneous phase of the channel being know to determine the average optimal window lengths, wherein the magnitude is not instantaneous, but is instead the average channel magnitude over a number of symbols.

There are various means known in the art for obtaining the PDP of the symbols, including but not limited to, equiweight averaging and exponential weighted averaging. In exponential weighted averaging, more weight is placed on more recent symbols and weights are determined from the exponential function and interpolation between symbols, after a weighting period.

In the following analysis, the solutions to window length calculations are not provided but performance gain is illustrated.

Provided the solutions are known, the subcarrier specific window requires additional $$\sum_{L^W \in L^{S\hat{S}WV L_i^{fix}}} \left(4L^W + \frac{N}{2}\log_2 N\right)$$

multiplications and $$\sum_{L^W \in L^{S\hat{S}WV L_i^{fix}}} (2L^W + N\log_2 N)$$

additions on top of fixed windowing, due to additional overlapping (first terms) and FFT operations (second terms).

An exemplary embodiment, with the following parameters, was simulated to demonstrate the gains of the proposed method of the present invention. In the exemplary embodiment, $\alpha_u$, CIRs and time offset between users are randomized at each run. $\hat{H}_{i,u}=H_{i,u} \forall i$, u and $\mathbb{E}_i\{h_{i,u} h^*_{i-\Delta i,u}\}=P_u\delta(\Delta i)$. $P_{-1}=P_1$ always, and are equal to $2P_0$ in the remaining figures, with the exception of FIG. 4. In the exemplary embodiment, there is no guard band between any user, the first subcarrier of the user with a narrower bandwidth is located at the first null of the adjacent user's edge-most subcarrier. Additionally, in the exemplary embodiment, $2\Delta f_{-1}=\Delta f_0=\Delta f_1/2$, where user indices distinguish their order in the spectrum. The rest of the variables are given in the sampling rate of user 0. $N_{\{-1,0,1\}}=\{512, 256, 128\}$, $M_{\{-1,0,1\}}=\{123, 127, 31\}$, and $K_{\{-1,0,1\}}=\{36, 18, 9\}$ whereas $L_{\{-1,0,1\}}=\{64, 32, 16\}$.

FIG. 1 illustrates the post-equalization expected aggregate interference for unknown signals 100 and the actual interference for known signals 105, for a single realization of the aforementioned exemplary embodiment. As shown, the expected interference calculations are accurate in determining the actual interference, but a slight mismatch occurs due to the dependence of the signal of interest on the multi-path fading of the signal transmitted in the adjacent channel and the resulting adjacent channel interference (ACI) on the interfering users' signals.

Figure 2A:
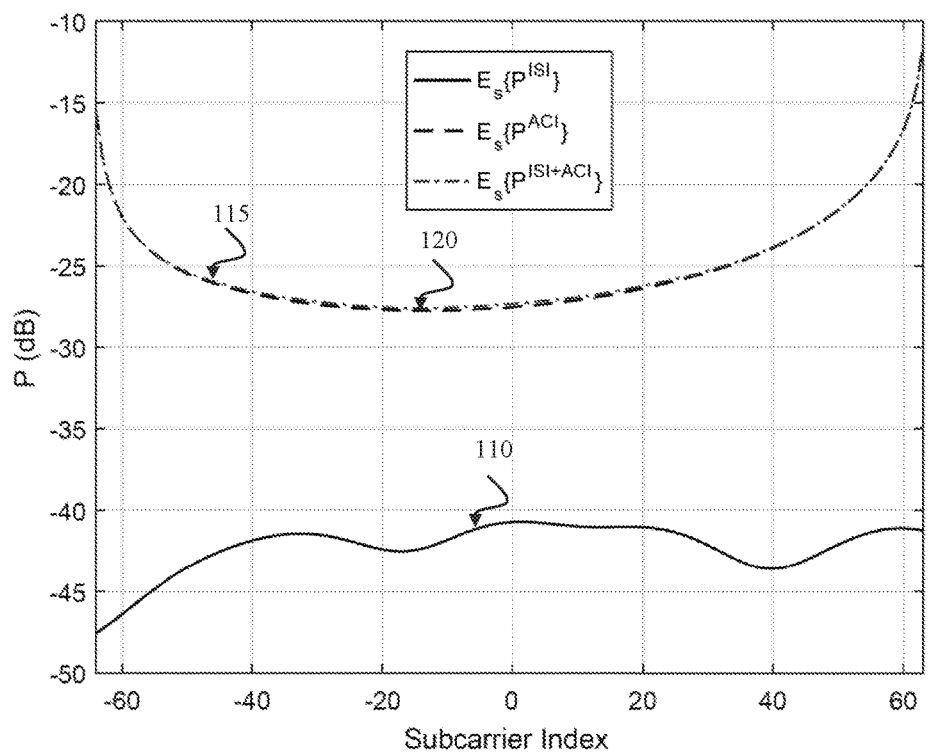
FIG. 2A is a graphical illustration of pre-window interference in desired user's signal for one realization.
Figure 2B:
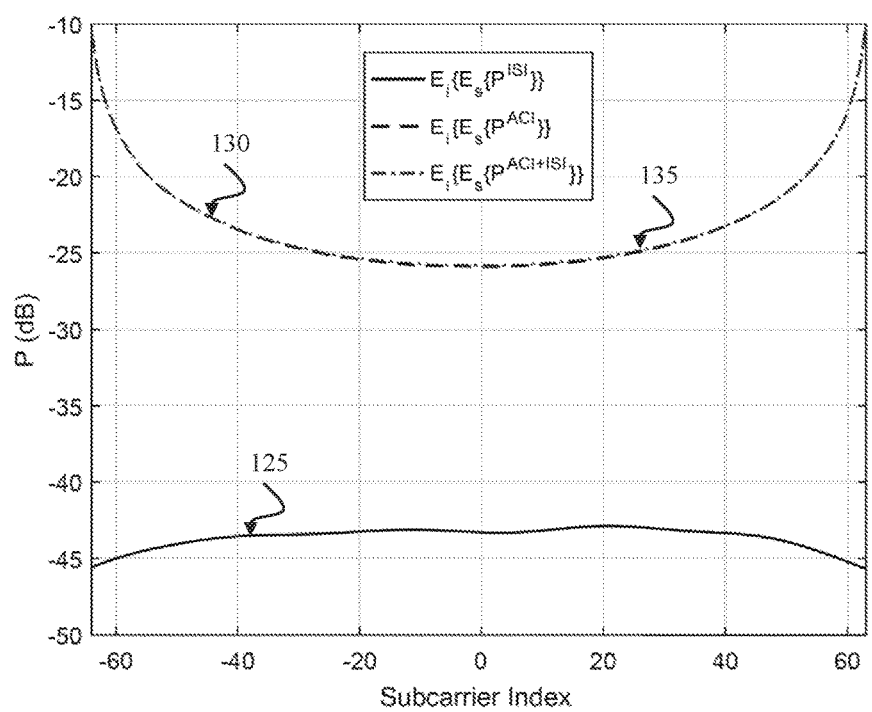
FIG. 2B is a graphical illustration of pre-window interference in desired user's signal for mean of many realizations.

The ISI power 110, consisting of both the distortion of the symbol of interest and the leakage from the preceding symbol of desired symbol, the ACI power 120 and the combined interference power of the ISI power and the ACI power 115 at the subcarriers of the signal of interest are shown in FIG. 2A and FIG. 2B. In case of a single realization shown in FIG. 2A, the dependency of the users' signals on the instantaneous channels of interfering users can be observed by the power offset at the edge subcarriers, although both interferers have the same transmit powers. As the results are averaged over many realizations, as shown in FIG. 2B, the ISI power 125 becomes uniform throughout the subcarriers and the ACI power 135 becomes stronger at edges and weaker in inner subcarriers, resulting in the combined interference power of the ISI power and the ACI power 130 over many realizations.

FIG. 1 illustrates the effect that echoes, or time dispersion, has on the power of the received signal 105, caused by the multi-path propagation delay of the signals transmitted in the adjacent channels. Without multi-path fading, the power profile of the signal of interest 115 would be as shown in FIG. 2A. Therefore, the state of the multi-path fading caused by the echoes is critical to the determination of the amount of interference present on a received pulse of interest.

While it is known in the art to use optimal pulse shaping functions for individual subcarriers to minimize ISI, the durations of the pulses remained the same for all the subcarriers. As such, the dependence of the signal of interest on the information contained in the symbols and the characteristics of the channel have not been considered in the previous works.

The present invention addresses the echoes in the received pulse, which result from multi-path fading, in addition to the effect of the multi-path fading in the frequency domain, due to the channel. In various embodiments, the amount of adjacent channel interference (ACI) and intersymbol interference (ISI) that would be introduced into a received pulse of interest can be found from equation (8). As such, the expected aggregate interference (ACI+ISI) to the nth received subcarrier of the desired user resulting from the information of all the users of the channel and the channel response can be determined.

Assuming the information transmitted by the users may or may not be known and the channel response may or may not be known, maximum likelihood approximations can be used to determine the resulting interference if:

1) The information is not known, but the channel is response is known.

2) The information and the channel response are known, but the power delay profile (PDF) of the channels are known.

3) Only the mean received power of each signal is known.

In order to identify an optimum window duration for each subcarrier that minimizes the sum of the ACI and ISI at that subcarrier, it is necessary to calculate the interference as a function of the information contained within the signal and the channel response.

In a particular embodiment, an iterative optimization method may be implemented to determine the optimum window duration for each of the subcarriers. In this embodiment, a memory of the receiver may store all the corresponding pulse shapes for each of the subcarriers and the associated window durations. A processor of the receiver may then be used to find the optimum window duration of the center subcarrier by starting from no windowing and increasing the window length at each iteration. The processor then solves for the expected aggregate interference (equation (8)) using each saved pulse shape (variable B in equation (8)). The expected aggregate interference is determined based upon what is known about the signal, such as the information contained in the signal and the channel impulse response (CIR). The operation continues by increasing the window length at each iteration, until the calculation results in an increase in the expected aggregate interference. It is then determined that the optimum duration of the window for the center subcarrier is the length prior to the length having an increased expected aggregate interference.

After determining the optimum duration of the window for the center subcarrier of the user of interest, the method continues by solving for the subcarriers adjacent to the center subcarrier. In solving for the optimum duration window of adjacent subcarriers, the iterative process begins by setting the duration of the adjacent subcarrier(s) to be equal to the optimum duration window of the center subcarrier, since the result for the adjacent subcarrier(s) is not expected to change rapidly for adjacent subcarriers. Since the overall system is convex, the local minimum is equivalent to the global minimum. As such, progressing toward the minimum value for each individual subcarrier approaches a global solution for all the subcarriers. Using the length of the center subcarrier optimum duration window as a starting point for the determination of the optimum duration window for each adjacent subcarrier insures an efficient computation of the global solution. In this iterative method, calculations for both shorter and longer window durations are made until the window duration that minimizes the estimated aggregate interference is determined for each subcarrier adjacent to the center subcarrier of the user's signal of interest. The method continues by finding the optimum window duration of each subcarrier of the user of interest, using the optimum window duration of an adjacent subcarrier as the initial starting point for the iteration.

Figure 3A:
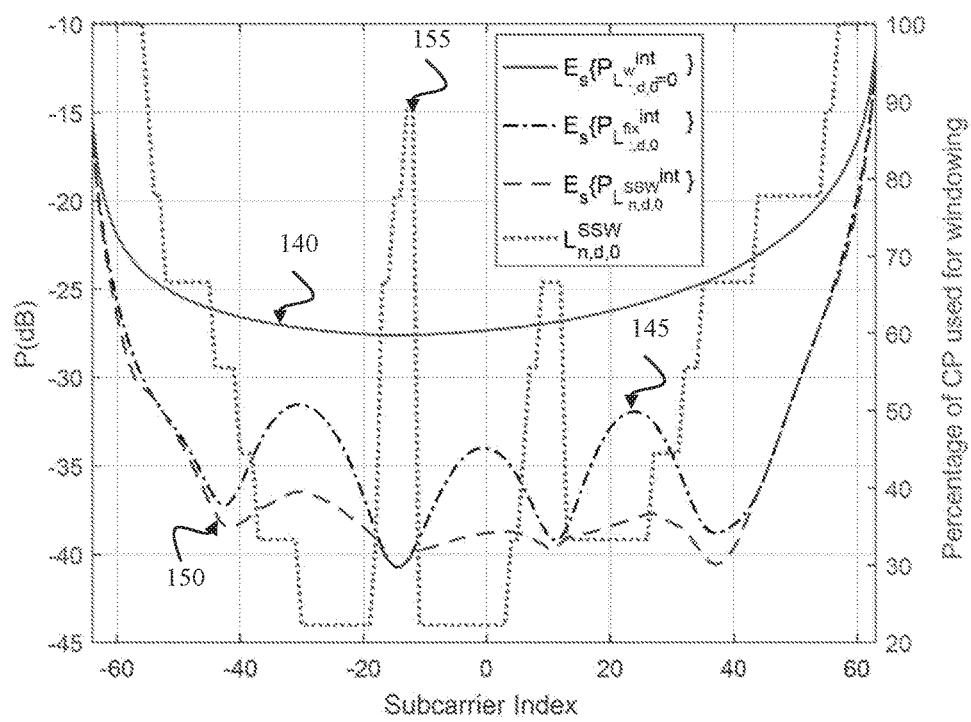
FIG. 3A is graphical illustration of a one realization for $L_{n,i}^{\overline{SW}}/K$ and $\mathbb{E}_s\{P_{n,d,0}^{int}\}$ for $L_{n:d,0}^{W}=\{0, L_d^{fix}, L_{n,d}^{\overline{SW}}\}$.
Figure 3B:
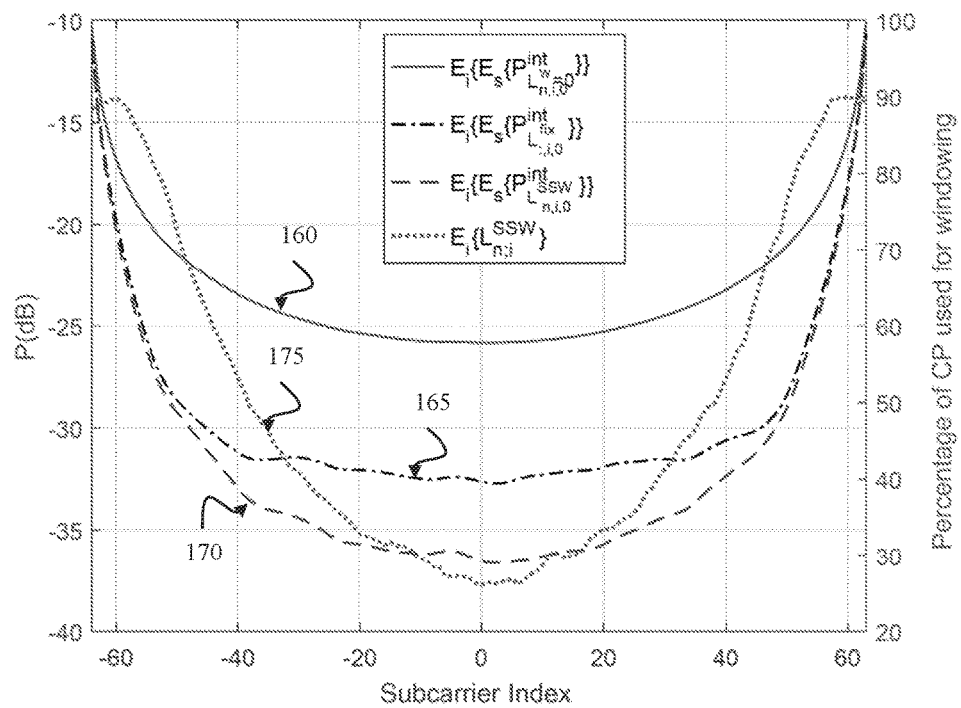
FIG. 3B is a graphical illustration of a mean of many realizations for $L_n^{\overline{avs}}/K$ and $\mathbb{E}_j\{\mathbb{E}_s\{P_{n,i,0}\}\}$ for $L_{n,j,0}^{W}=\{0, L_j^{fix}, L_{n,i}^{\overline{SW}}\}$.

The results of the grid search for optimal subcarrier specific window (SSW) length for known channel impulse responses (CIRs), thereby satisfying equation (9), are shown in FIG. 3A and FIG. 3B, for the same realization depicted in FIG. 2B. FIG. 3A illustrates the optimum window duration 155 for one realization and the estimated aggregate interferences 140, 145, 150 for various known parameters. FIG. 3B illustrates a mean of many realizations for the average optimum window duration 175 and the mean estimated aggregate interferences 160, 165, 170 for various known parameters. As shown, the results agree with the channel dependency of optimal SSW lengths. As shown in FIG. 3B, longer window durations are required at the edge subcarriers.

Figure 4:
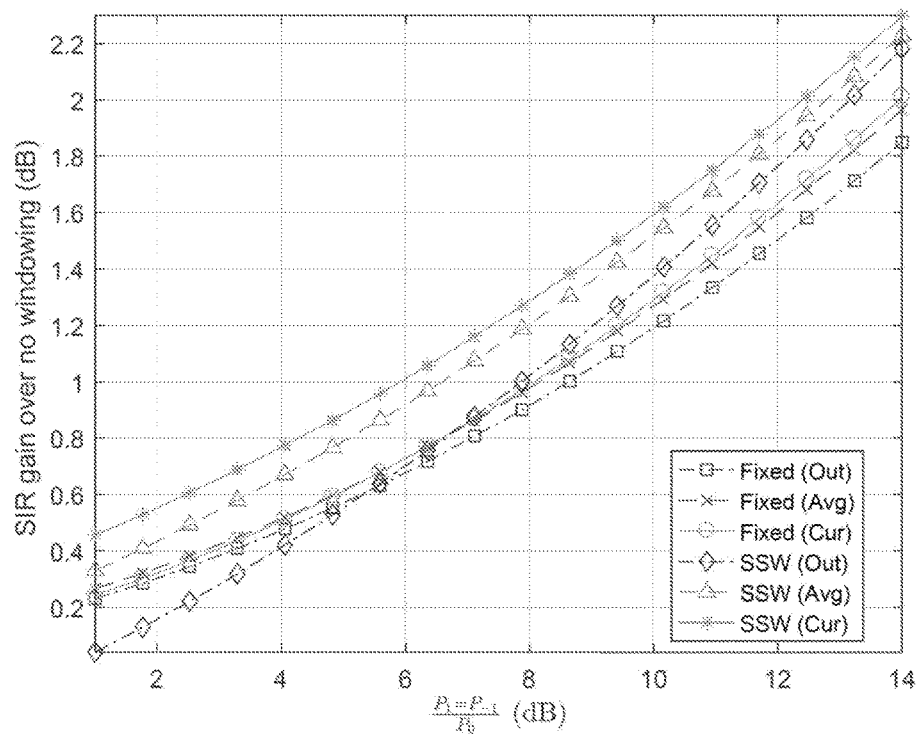
FIG. 4 is a graphical illustration of SIR gain of receivers with $L_{n,i,u}^{W}=\{L_{i-1,u}^{fix}, L_u^{\tilde{a}vf}, L_{i,u}^{fix}, L_{n,i-1,u}^{\overline{SW}}, L_{n,u}^{\tilde{a}vs}, L_{n,i,u}^{\overline{SW}}\}$ over no windowing for different interferer power offsets.

The signal to interference ratio (SIR) gains of seven different receivers, over many power offsets, were calculated and the gain vs. a "no-windowing scenario" is presented in FIG. 4. As shown, implementing SSW guarantees higher gain than fixed windowing, with current and average optimal length and outdated lengths become robust as interferers become more powerful. Since the channel impulse response (CIR) is estimated at the receiver and then fed back to the transmitter, however, the estimated CIR cannot be used directly to select the parameters for the adaptive transmission because is quickly becomes outdated due to the rapid channel variation caused by multipath fading. Most carriers are still windowed efficiently, albeit fluctuations occur around the expected interference trend with outdated CIRs and PDPs, but the performance recedes compared to current lengths due to the non-optimal windowing as the CIRs of all users may have changed drastically.

Figure 5:
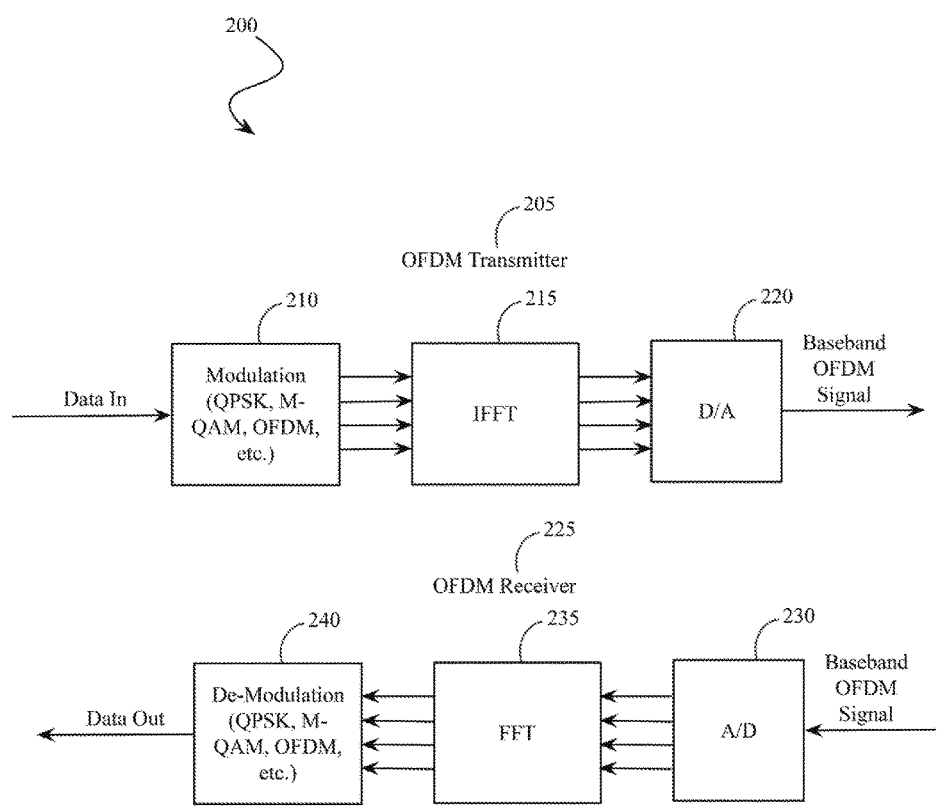
FIG. 5 is an illustration of an OFDM-based system for implementing the various methods of the present invention.

As shown with reference to FIG. 5, the method of the present invention may be employed in system 200 comprising an OFDM transmitter 205 and/or an OFDM receiver 225. As shown with reference to FIG. 5, the OFDM transmitter 205 includes a modulation module 210 configured to receive incoming data and to generate an OFDM-based signal comprising a plurality of subcarriers. The OFDM transmitter 205 further includes an Inverse Fast Fourier Transform (IFFT) module 215, operating as a transmitter filter to filter the subcarriers of the OFDM-based signal using the proposed subcarrier specific based windowing scheme to generate a filtered OFDM-based signal. The filtered OFDM-based signal is then provided to a digital-to-analog module 220 of the transmitter prior to transmission of the filtered OFDM-based signal over the channel. In addition, the OFDM receiver 225 includes an analog-to-digital module 230 configured to receive incoming OFDM-based signals comprising a plurality of subcarriers that has been transmitted over the channel. The analog-to-digital module 230 provides the digital representation of the OFDM-based signals to a Fast Fourier Transform (FFT) module, operating as a receiver filter 235 to filter the subcarriers of the OFDM-based signal using the proposed subcarrier specific windowing scheme of the present invention to generate a filtered OFDM-based signal. The filtered OFDM-based signal is then provided to a demodulation module 240 of the receiver prior to transmission of the demodulated data over the channel. As such, the proposed windowing scheme utilizes the expected aggregate interference power to determine subcarrier specific window lengths that minimize the interference. Thus, maximum ACI and ISI suppression is achieved at the transmitter 205 and maximum ACI and ISI rejection is achieved at the receiver 225. Since transmit and receive windowing are independent of each other, they can be used together or independently in the transmitter 205 or the receiver 225.

With the present invention, expected and instantaneous interference powers have been determined. Interference power is used to determine subcarrier specific window lengths (SSWs) that minimize the interference. Numerous guidelines with various computational complexities to determine optimal window lengths under insufficient CP have been identified. The proposed subcarrier specific windowing scheme improves SIR even when CP is insufficient. Average optimal window lengths depend only on PDPs, and although instantaneous optimal window lengths depend on users' CIRs, fluctuation is minimal. Therefore, subcarrier specific windowing outperforms fixed windowing, even with outdated window lengths, such as in the case of powerful interferers.

Future wireless communication networks are planned to service asynchronous users in adjacent bands, utilizing reduced guard bands, in order to be able to service as many users as possible and to reduce latencies. In various embodiments, the present invention enhances communication performance by adaptively mitigating the interference that results due to the reduction of both guard bands and guard times. The embodiments of the invention help to enable high performance communication services while also increasing the number of served users and reducing latencies and redundancies.

The various techniques described herein can be implemented in connection with hardware or software or, where appropriate, with a combination of both. Thus, the methods and system described herein, or certain aspects or portions thereof, can take the form of program code (i.e., instructions) embodied in tangible media, such as hard drives, solid state drives, or any other machine-readable storage medium, wherein, when the program code is loaded into and executed by a machine, such as a computing device, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the invention. Additionally, any storage techniques used in connection with the invention can be a combination of hardware and software.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method for windowing of an Orthogonal Frequency Division Multiplexing (OFDM)-based signal, the method comprising:
   receiving, at a receiver, an OFDM-based signal comprising a plurality of subcarriers;
   estimating an aggregate adjacent channel interference (ACI) and intersymbol interference (ISI) at each of the plurality of subcarriers;
   estimating an optimal window duration for each of the plurality of subcarriers, wherein the optimal window duration is the duration that minimizes the aggregate adjacent channel interference (ACI) and intersymbol interference (ISI) at each of the plurality of subcarriers; and
   performing, at the receiver, windowing of each of the plurality of subcarriers of the received OFDM-based signal by multiplying each of the plurality of subcarriers by the optimal window duration to generate a filtered OFDM-based signal.

2. The method of claim 1, wherein the optimal window duration for each of the plurality of subcarriers is an instantaneous optimal window duration and wherein estimating an optimal window duration for each of the plurality of subcarriers, wherein the optimal window duration is the duration that minimizes the aggregate adjacent channel interference (ACI) and intersymbol interference (ISI) at each of the plurality of subcarriers using power density profile (PDF) and channel impulse (CIR) for each of the plurality of subcarriers.

3. The method of claim 1, wherein the optimal window duration for each of the plurality of subcarriers is an instantaneous average window duration and wherein estimating an optimal window duration for each of the plurality of subcarriers, wherein the optimal window duration is the duration that minimizes the aggregate adjacent channel interference (ACT) and intersymbol interference (ISI) at each of the plurality of subcarriers using power density profile (PDF) for each of the plurality of subcarriers.

4. The method of claim 1, wherein estimating an optimal window duration for each of the plurality of subcarriers, wherein the optimal window duration is the duration that minimizes the aggregate adjacent channel interference (ACI) and intersymbol interference (ISI) at each of the plurality of subcarriers further comprises:
   estimating the aggregate ACI and ISI for a center subcarrier with no windowing;
   iteratively increasing a duration of the window of the center subcarrier and re-estimating the aggregate ACI and ISI, until a longest duration window that does not increase the aggregate ACI and ISI is identified as the optimal window duration of the center subcarrier;
   setting durations of windows for subcarriers adjacent to the center subcarrier to be equal to the optimal window duration of the center subcarrier; and
   iteratively increasing and decreasing the duration of the window for the adjacent subcarriers until a longest duration window that does not increase the aggregate ACI and ISI is identified as the optimal window duration of the adjacent subcarriers.

5. The method of claim 1, wherein the OFDM-based signal is equalized before estimating the aggregate ACI and ISI for each of the plurality of subcarriers.

6. A method for windowing of an Orthogonal Frequency Division Multiplexing (OFDM)-based signal, the method comprising:
   receiving, at a transmitter, an OFDM-based signal comprising a plurality of subcarriers;
   estimating an aggregate adjacent channel interference (ACI) and intersymbol interference (ISI) at each of the plurality of subcarriers;
   estimating an optimal window duration for each of the plurality of subcarriers, wherein the optimal window duration is the duration that minimizes the aggregate adjacent channel interference (ACI) and intersymbol interference (ISI) at each of the plurality of subcarriers;
   performing, at the transmitter, windowing of each of the plurality of subcarriers of the received OFDM-based signal by multiplying each of the plurality of subcarriers by the optimal window duration to generate a filtered OFDM-based signal; and
   transmitting, from the transmitter, the filtered OFDM-based signal.

7. The method of claim 6, wherein the optimal window duration for each of the plurality of subcarriers is an instantaneous optimal window duration and wherein estimating an optimal window duration for each of the plurality of subcarriers, wherein the optimal window duration is the duration that minimizes the aggregate adjacent channel interference (ACI) and intersymbol interference (ISI) at each of the plurality of subcarriers using power density profile (PDF) and channel impulse (CIR) for each of the plurality of subcarriers.

8. The method of claim 6, wherein the optimal window duration for each of the plurality of subcarriers is an instantaneous average window duration and wherein estimating an optimal window duration for each of the plurality of subcarriers, wherein the optimal window duration is the duration that minimizes the aggregate adjacent channel interference (ACI) and intersymbol interference (ISI) at each of the plurality of subcarriers using power density profile (PDF) for each of the plurality of subcarriers.

9. The method of claim 6, wherein estimating an optimal window duration for each of the plurality of subcarriers, wherein the optimal window duration is the duration that minimizes the aggregate adjacent channel interference (ACI) and intersymbol interference (ISI) at each of the plurality of subcarriers further comprises:
   estimating the aggregate ACI and ISI for a center subcarrier with no windowing iteratively increasing a duration of the window of the center subcarrier and re-estimating the aggregate ACI and ISI, until a longest duration window that does not increase the aggregate ACI and ISI is identified as the optimal window duration of the center subcarrier;
   setting durations of windows for subcarriers adjacent to the center subcarrier to be equal to the optimal window duration of the center subcarrier; and
   iteratively increasing and decreasing the duration of the window for the adjacent subcarriers until a longest duration window that does not increase the aggregate ACI and ISI is identified as the optimal window duration of the adjacent subcarriers.

10. The method of claim 6, wherein the OFDM-based signal is equalized before estimating the aggregate ACI and ISI for each of the plurality of subcarriers.

11. A receiver for windowing of an Orthogonal Frequency Division Multiplexing (OFDM)-based signal, the receiver comprising:
   an analog to digital module configured for receiving an OFDM-based signal comprising a plurality of subcarriers;
   a receiver filter coupled to the analog to digital module, the receiver filter configured for estimating an aggregate adjacent channel interference (ACI) and intersymbol interference (ISI) at each of the plurality of subcarriers, for estimating an optimal window duration for each of the plurality of subcarriers, wherein the optimal window duration is the duration that minimizes the aggregate adjacent channel interference (ACI) and intersymbol interference (ISI) at each of the plurality of subcarriers and for performing windowing of each of the plurality of subcarriers of the received OFDM-based signal by multiplying each of the plurality of subcarriers by the optimal window duration to generate a filtered OFDM-based signal; and
   a demodulation module coupled to the receiver filter, the demodulation module configured for receiving the filtered OFDM-based signal and for demodulating each of the plurality of subcarriers of the OFDM-based signal.

12. The receiver of claim 1, wherein the optimal window duration for each of the plurality of subcarriers is an instantaneous optimal window duration and wherein estimating an optimal window duration for each of the plurality of subcarriers, wherein the optimal window duration is the duration that minimizes the aggregate adjacent channel interference (ACI) and intersymbol interference (ISI) at each of the plurality of subcarriers using power density profile (PDF) and channel impulse (CIR) for each of the plurality of subcarriers.

13. The receiver of claim 11, wherein the optimal window duration for each of the plurality of subcarriers is an instantaneous average window duration and wherein estimating an optimal window duration for each of the plurality of subcarriers, wherein the optimal window duration is the duration that minimizes the aggregate adjacent channel interference (ACI) and intersymbol interference (ISI) at each of the plurality of subcarriers using power density profile (PDF) for each of the plurality of subcarriers.

14. The receiver of claim 11, wherein estimating an optimal window duration for each of the plurality of subcarriers, wherein the optimal window duration is the duration that minimizes the aggregate adjacent channel interference (ACI) and intersymbol interference (ISI) at each of the plurality of subcarriers further comprises:
   estimating the aggregate ACI and ISI for a center subcarrier with no windowing;
   iteratively increasing a duration of the window of the center subcarrier and re-estimating the aggregate ACI and ISI, until a longest duration window that does not increase the aggregate ACI and ISI is identified as the optimal window duration of the center subcarrier;
   setting durations of windows for subcarriers adjacent to the center subcarrier to be equal to the optimal window duration of the center subcarrier; and
   iteratively increasing and decreasing the duration of the window for the adjacent subcarriers until a longest duration window that does not increase the aggregate ACI and ISI is identified as the optimal window duration of the adjacent subcarriers.

15. The receiver of claim 11, wherein the OFDM-based signal is equalized before estimating the aggregate ACI and ISI for each of the plurality of subcarriers.

16. A transmitter for windowing of an Orthogonal Frequency Division Multiplexing (OFDM)-based signal, the transmitter comprising:
   a modulation module configured to receive a digital signal to be transmitted, the modulation module configured to modulate the digital signal to generate an OFDM-based signal comprising a plurality of subcarriers;
   a transmitter filter coupled to the modulation module, the transmitter filter configured for estimating an aggregate adjacent channel interference (ACI) and intersymbol interference (ISI) at each of the plurality of subcarriers, for estimating an optimal window duration for each of the plurality of subcarriers, wherein the optimal window duration is the duration that minimizes the aggregate adjacent channel interference (ACI) and intersymbol interference (ISI) at each of the plurality of subcarriers and for performing windowing of each of the plurality of subcarriers of the received OFDM-based signal by multiplying each of the plurality of subcarriers by the optimal window duration to generate a filtered OFDM-based signal; and a digital to analog module coupled to the transmitter filter, the digital to analog module configured for transmitting the filtered OFDM-based signal.

17. The transmitter of claim 16, wherein the optimal window duration for each of the plurality of subcarriers is an instantaneous optimal window duration and wherein estimating an optimal window duration for each of the plurality of subcarriers, wherein the optimal window duration is the duration that minimizes the aggregate adjacent channel interference (ACI) and intersymbol interference (ISI) at each of the plurality of subcarriers using power density profile (PDF) and channel impulse (CIR) for each of the plurality of subcarriers.

18. The transmitter of claim 16, wherein the optimal window duration for each of the plurality of subcarriers is an instantaneous average window duration and wherein estimating an optimal window duration for each of the plurality of subcarriers, wherein the optimal window duration is the duration that minimizes the aggregate adjacent channel interference (ACI) and intersymbol interference (ISI) at each of the plurality of subcarriers using power density profile (PDF) for each of the plurality of subcarriers.

19. The transmitter of claim 16, wherein estimating an optimal window duration for each of the plurality of subcarriers, wherein the optimal window duration is the duration that minimizes the aggregate adjacent channel interference (ACI) and intersymbol interference (ISI) at each of the plurality of subcarriers further comprises:
   estimating the aggregate ACI and ISI for a center subcarrier with no windowing;
   iteratively increasing a duration of the window of the center subcarrier and re-estimating the aggregate ACI and ISI, until a longest duration window that does not increase the aggregate ACI and ISI is identified as the optimal window duration of the center subcarrier;
   setting durations of windows for subcarriers adjacent to the center subcarrier to be equal to the optimal window duration of the center subcarrier; and
   iteratively increasing and decreasing the duration of the window for the adjacent subcarriers until a longest duration window that does not increase the aggregate ACI and ISI is identified as the optimal window duration of the adjacent subcarriers.

20. The transmitter of claim 16, wherein the OFDM-based signal is equalized before estimating the aggregate ACI and ISI for each of the plurality of subcarriers.

* * * * *